Feb. 11, 1958 — W. E. LANHAM — 2,822,942

ROLL DUMP AND TURN OVER

Filed Aug. 23, 1954

INVENTOR
William E. Lanham
BY
Curtis, Morris & Safford
ATTORNEYS

United States Patent Office 2,822,942
Patented Feb. 11, 1958

2,822,942

ROLL DUMP AND TURN OVER

William E. Lanham, Atlanta, Ga.

Application August 23, 1954, Serial No. 451,642

5 Claims. (Cl. 214—308)

This invention relates to handling bakery products, and more in particular to removing rolls, buns, and the like from the pans in which they have been baked.

An object of this invention is to provide an improved arrangement for loosening and removing buns, rolls and the like from the pans in which they have been baked. A further object is to provide an arrangement for dumping baked goods from pans, and for inverting or turning them over so that they reside upright. A further object is to provide for the above with apparatus that is sturdy in construction, compact, reliable in operation, efficient, and adaptable to the conditions of operation and use which are encountered in the bakery field. These and other objects will be in part obvious, and in part pointed out below.

In baking rolls, hamburger buns, and hot dog buns, and similar products, it is customary to perform the baking operation in large flat pans. After the buns have been baked, it is desirable to remove them from the pans, and to cool them. However, the buns tend to stick to the pans, and the pans are hot. The present invention provides a very satisfactory arrangement for removing the buns from the pans.

Figure 1:
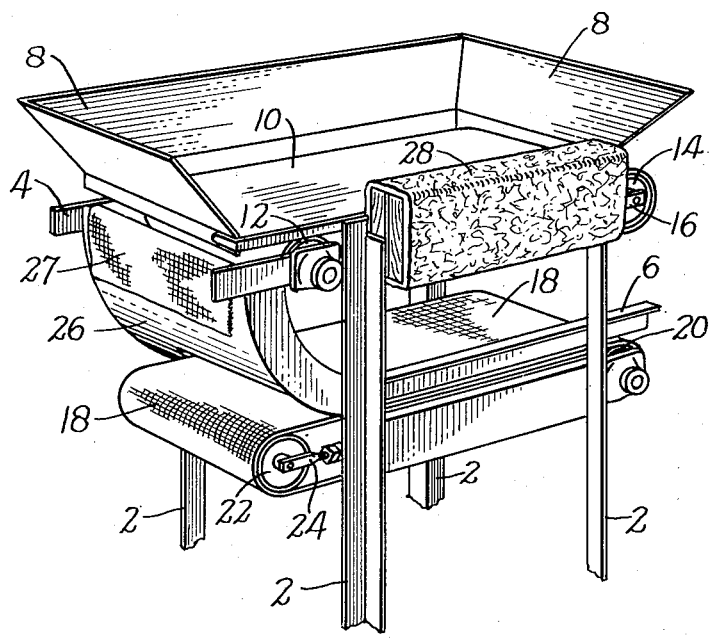
Figure 1 is a perspective view of one embodiment of the invention.
Figure 2:
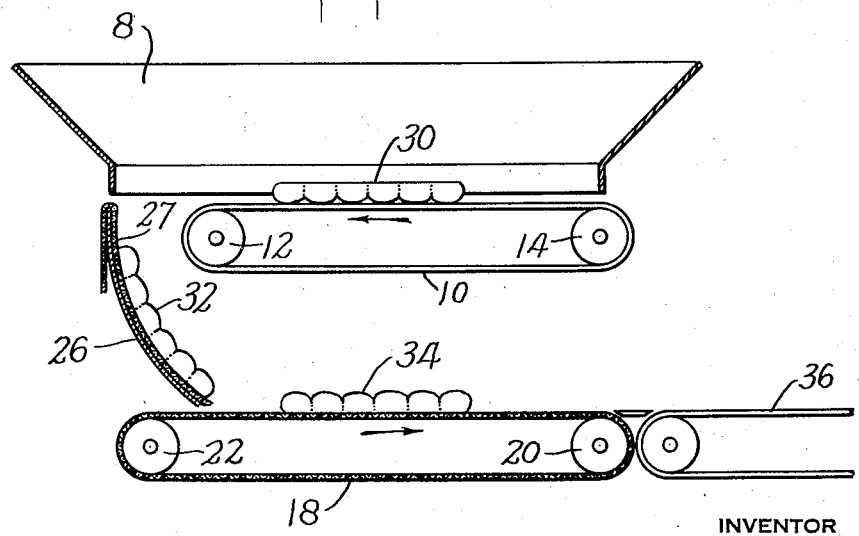
Figure 2 is a somewhat schematic sectional view of the embodiment of Figure 1.

Referring to Figure 1 of the drawing, the apparatus includes a frame construction supported on four legs 2, and having a rectangular top frame 4 welded to the tops of the legs. There are also two side rails 6 which extend along the sides of the apparatus between the respective pairs of legs. The top frame 4 has welded to it three upwardly diverging side walls 8 which may act to support a pan resting thereon, and which tend to direct the products onto the frame (see Figure 2). Positioned directly beneath frame 4 is a flexible neoprene belt 10 which is supported upon a pair of rollers 12 and 14. As shown best in Figure 1, roller 14 is adjustably mounted at 16 to permit adjustment of the tension on belt 10. Belt 10 is driven through roller 14 by a drive motor not shown.

Referring again to Figure 2, directly beneath belt 10 and extending to the left thereof is a wire mesh belt 18 which is mounted upon a fixed roller 20, and an adjustable roller 22. As shown in Figure 1, roller 22 is adjusted at 24 so as to control the tension of belt 18. Belt 18 is driven from roller 20. Extending downwardly from frame 4 is an arcuate chute 26 which extends (Figure 2) down to the left-hand end of the upper run of belt 18. Chute 26 is covered by a strip of wire mesh at 27 so that it provides a vacuum-free sliding surface. Referring again to Figure 1, the near legs 2 support a padded bumper block 28 which is positioned so that the pans of rolls may be bumped upon it to loosen the rolls from the bottom of the pan.

During use, for example, the pans of rolls are lifted individually and bumped upon the bumper block 28 to first loosen the rolls from the pan. The pan is then inverted with a quick motion, so as to dump the rolls to the position indicated at 30 in Figure 2. With belt 10 moving as indicated by the arrow, the buns are carried to the left-hand end of the belt, and when the leading edge of the buns is unsupported, it bends downwardly, and it moves into contact with the upper surface of chute 26. The shape of this surface is such that it deflects this leading edge of the buns downwardly and, upon further movement of belt 10, the rolls move down the chute as indicated at 32. They slide freely, and they are received by belt 18 which has its top run moving to the right so that the rolls are moved to the right as indicated at 34. At the right-hand end of belt 18, the buns are passed to an endless belt 36 which carries them to the cooling apparatus.

It is thus seen that the rolls are removed from the pan in an efficient manner, and they are started to the cooling operation in their upright position, that is, supported as they were positioned in the pan. The smooth tops of the buns are not damaged by this operation and, as the buns are cooled, they are so supported and handled that they are not damaged. This improves the over-all handling and cooling operation, and it also insures against damage to the rolls. The rolls are also delivered to the packing position at a uniform temperature and in an orderly manner.

With this embodiment of the invention, the tops of the rolls or the like contact only the neoprene belt 10. The bottoms of the rolls or the like contact only the wire mesh. The bottom surfaces of the rolls may tend to become moist, and this may tend to create a vacuum condition and sticking on smooth surfaces, but such a condition is prevented by the wire mesh.

I claim:

1. In an apparatus for bumping, dumping, and turning rolls, buns, and the like from a pan, the combination of a frame, an upper endless belt mounted upon said frame to move in one direction, a padded bumper block mounted on the frame at one side of the belt on which the pans may be bumped to loosen the product therein, side walls inclined downwardly and inwardly toward the belt and providing a support for the edges of the pan above the belt for dumping the product in inverted position thereon, a second endless belt mounted on said frame below the first belt to move in the opposite direction therefrom, and a chute having a wire mesh surface and spaced at its upper end from the end of the upper belt and extending downwardly and rearwardly toward the end of the second belt to provide a guiding surface for turning the product from inverted to upright position and deliver the product onto the lower belt.

2. In an apparatus for bumping, dumping and turning rolls, buns, and the like from a pan, the combination of an upright frame, an upper endless belt mounted on said frame to move in one direction, means projecting upwardly from the frame at one side of the belt on which the pan may be bumped to loosen the product therein, side walls providing a support for the edges of the pans above the belt to permit dumping of the product in inverted position on the upper belt, a lower endless belt mounted on said frame below the first belt to move in the opposite direction therefrom, and chute means between the end of the first belt and the beginning of the second belt for turning the product from inverted to upright position and deliver it onto the lower belt, said chute means having a wire mesh facing.

3. Apparatus in accordance with claim 2 in which the upper belt is formed of neoprene and said lower belt is formed of wire mesh.

4. In a device of the character described wherein hot and moist rolls and the like are to be depanned, turned right side up, and fed to a supply line, the combination of an upper generally horizontal endless belt having a top and bottom run meeting at an end of said belt, said belt being adapted to receive from baking pans rolls and the like in inverted position and to advance them in a given direction and off the end of said belt, an arcuate chute positioned at said end and spaced therefrom a short distance, said chute having a width generally parallel to said end, the upper end of said chute being generally vertical and at right angles to said given direction, said chute being bent inwardly along its length and being rigid and substantially continuous over its surface, a wire mesh curtain draped over the inner surface of said chute and lying limply therealong from its top end downward beyond its bottom end, and a lower conveyor belt generally horizontal and spaced slightly below the bottom end of said chute and adapted to advance rolls in a direction opposite to said given direction, the bottom end of said chute being inclined at a gentle angle relative to said lower belt, whereby when hot moist rolls and the like are dumped on the top run of said upper belt they will be advanced over the end thereof and will slide without sticking or damage downward along said chute on said wire mesh curtain beyond the end thereof and onto said lower conveyor belt.

5. The combination of elements as in claim 4 wherein said lower conveyor belt is made of wire mesh.

References Cited in the file of this patent
UNITED STATES PATENTS

| | | |
|---|---|---|
| 1,473,996 | McGarry | Nov. 3, 1923 |
| 1,482,667 | Van Houten | Feb. 5, 1924 |
| 1,700,438 | Hungerford | Jan. 29, 1929 |
| 2,673,652 | Steadman | Mar. 30, 1954 |
| 2,724,351 | Kottmann | Nov. 22, 1955 |